(12) United States Patent
Rutkowski et al.

(10) Patent No.: US 6,550,319 B1
(45) Date of Patent: *Apr. 22, 2003

(54) FAULT DIAGNOSTIC FOR AN INTERNAL COMBUSTION ENGINE HAVING AIR ASSISTED INJECTORS

(75) Inventors: Brian D. Rutkowski, Ypsilanti, MI (US); Howard Edmund Scheer, West Bloomfield, MI (US); Michael John Cullen, Northville, MI (US)

(73) Assignee: Ford Global Technologies, Inc., Dearborn, MI (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/200,947

(22) Filed: Nov. 30, 1998

(51) Int. Cl.[7] ................................................ G01F 15/00
(52) U.S. Cl. ..................................................... 73/119 A
(58) Field of Search ...................... 73/119 A; 123/327, 123/339.17, 480, 478

(56) References Cited

U.S. PATENT DOCUMENTS

| | | | |
|---|---|---|---|
| 4,437,342 A | * 3/1984 | Hosaka et al. | ............ 73/119 A |
| 4,531,490 A | 7/1985 | Kishi et al. | |
| 4,875,456 A | 10/1989 | Tomisawa | |
| 5,148,788 A | * 9/1992 | Saikalis et al. | ............. 123/339 |
| 5,406,919 A | 4/1995 | Ikuta et al. | |
| 5,409,169 A | * 4/1995 | Saikalis et al. | ............. 239/404 |
| 5,487,372 A | * 1/1996 | Iida et al. | .................... 123/585 |
| 5,526,796 A | * 6/1996 | Thring et al. | ................ 123/531 |
| 5,606,951 A | 3/1997 | Southern et al. | |
| 5,623,904 A | * 4/1997 | Matsumoto | ............ 123/339.23 |
| 5,809,965 A | 9/1998 | Atanasyan | |

* cited by examiner

Primary Examiner—Harshad Patel
(74) Attorney, Agent, or Firm—Ford Global Technologies, Inc.

(57) ABSTRACT

An internal combustion engine having electronic throttle control includes an air assisted injector system for directing a controlled amount of air directly to the combustion chamber without passing through the throttle body. A method of diagnosing faults in the air assisted injector system is disclosed. The method comprises the steps of measuring the airflow entering an intake of the electronic throttle of the engine at idle speed with the air assisted injector system operating at a first rate of airflow, turning the air assisted injector system off, measuring the airflow entering the intake of the electronic throttle of the engine at idle speed with the air assisted injector system off, and generating an error signal as a function of the two measured values.

13 Claims, 8 Drawing Sheets

FAULT DIAGNOSTIC FOR AN INTERNAL COMBUSTION ENGINE HAVING AIR ASSISTED INJECTORS

TECHNICAL FIELD

This invention relates to air control systems for internal combustion engines and more particularly to a method of diagnosing degradation in an air assisted injector system of an engine having electronic throttle control.

BACKGROUND

Internal combustion engines use fuel injectors to precisely control the amount of fuel inducted into the engine's cylinders. Also, fuel injectors atomize the liquid fuel, increasing the homogeneity of the air and fuel mixture. Air assisted injectors provide auxiliary airflow to the engine which bypasses the throttle. Air assisted injectors use this airflow to enhance fuel atomization. Air assisted injectors are preferred in vehicles where additional fuel atomization can promote better combustion and lower regulated emissions. Air assisted injector systems can influence vehicle emissions, however, and therefore are subject to governmental regulations. These regulations require, among other things, that the air assisted injector systems be monitored for malfunctions.

Emissions diagnostics can be conducted during different engine operating states, such as acceleration, deceleration, fuel shutoff, or steady state idle. In automotive applications, a primary concern of any diagnostic test is that it be transparent to the vehicle operator. For robustness and accuracy of the diagnostic, however, it may be necessary to alter the flow of air or fuel to the engine.

Accordingly, there is a need for a diagnostic procedure which detects degradations in the air assisted injector system, yet is transparent to the vehicle operator.

SUMMARY OF THE INVENTION

It is an object of the present invention to provide an air assisted injector diagnostic which accurately detects faults in an air assisted injector of an internal combustion engine having electronic throttle control while the engine is operating at steady state idle.

The above object is achieved by providing a method of diagnosing faults in an air assisted fuel injector system of an internal combustion engine having electronic throttle control. The method comprises the steps of measuring the airflow entering an intake of the electronic throttle of the engine at idle speed with the air assisted injector system operating at a first rate of airflow, turning the air assisted injector system off, measuring the airflow entering the intake of the electronic throttle of the engine at idle speed with the air assisted injector system off, and generating an error signal as a function of the two measured values. This error signal can be used, for example, to alert the operator of an emission system malfunction.

Other objects and advantages of the present invention will become apparent upon considering the following detailed description and appended claims, and upon reference to the accompanying drawings.

DESCRIPTION OF THE PREFERRED EMBODIMENT(s)

Figure 1:
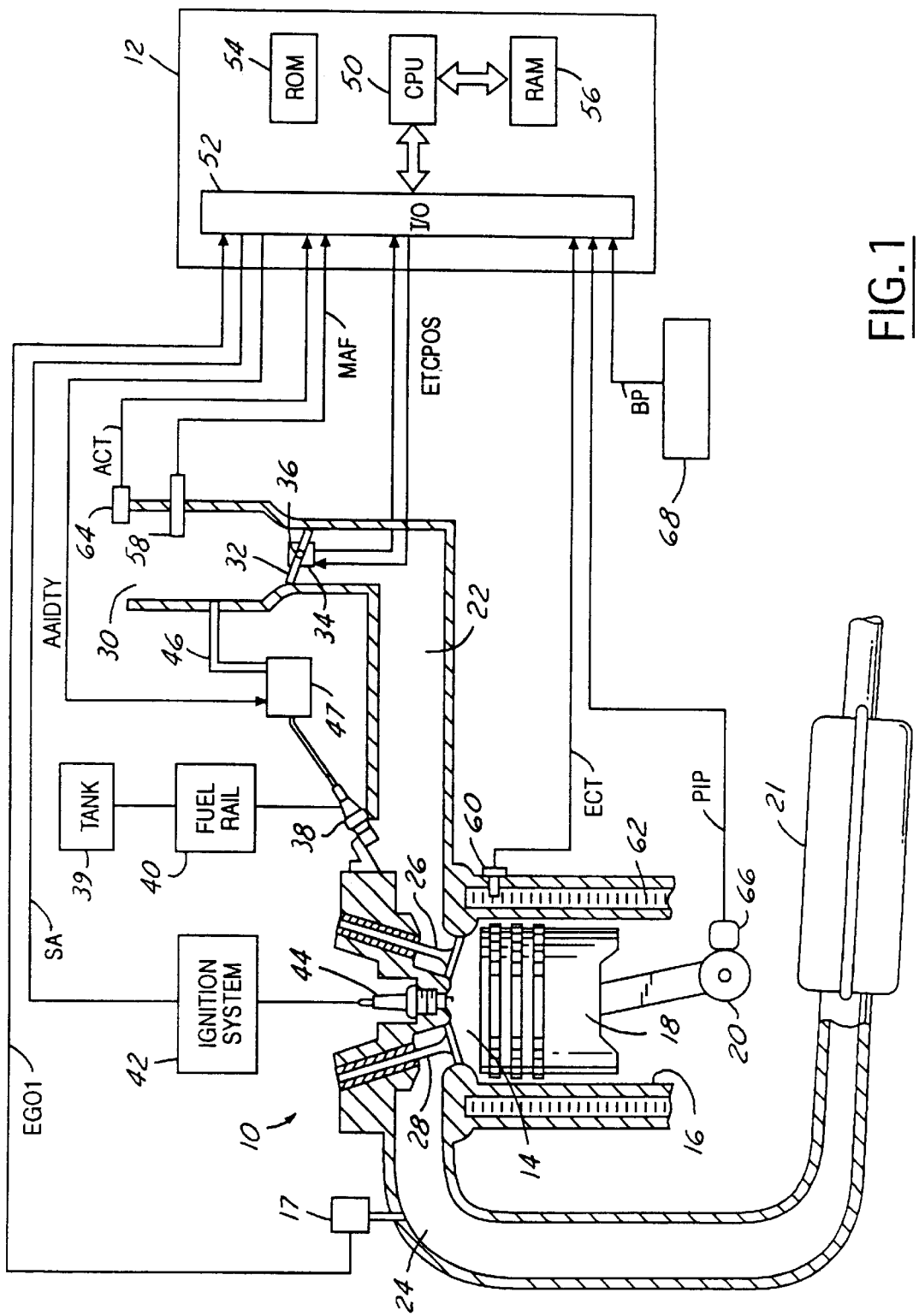
FIG. 1 is a block diagram of an engine incorporating air assist injectors.

Referring to FIG. 1, internal combustion engine 10 comprising a plurality of cylinders, one cylinder of which is shown in FIG. 1, is controlled by electronic engine controller 12. Engine 10 includes combustion chamber 14 and cylinder walls 16 with piston 18 positioned therein and connected to crankshaft 20. Combustion chamber 14 is shown communicating with intake manifold 22 and exhaust manifold 24 via respective intake valve 26 and exhaust valve 28. Intake manifold 22 is shown communicating with throttle body 30 via throttle plate 32. Primary air control is governed by throttle plate 32. Throttle plate 32 is controlled by an electronic throttle controller 34. Throttle position of throttle plate 32 is measured by throttle position sensor 36. Controller 12 provides signal ETCPOS to electronic throttle controller 34 so that airflow is inducted into engine 10 around throttle plate 32 at a rate proportional to the signal ETCPOS. Intake manifold 22 is also shown having air assist injector 38 coupled thereto for delivering liquid fuel in proportion to the pulse width of a signal from controller 12. Fuel is delivered to fuel injector 38 by a conventional fuel system including fuel tank 39, fuel pump (not shown), and fuel rail 40.

Conventional distributorless ignition system 42 provides ignition spark to combustion chamber 14 via spark plug 44 in response to spark advance signal SA from controller 12.

Catalytic type exhaust gas oxygen sensor 17 is shown coupled to exhaust manifold 24 upstream of catalytic converter 21. Sensor 17 provides signal EGO to controller 12 which converts signal EGO into a two-state signal. A high voltage state of converted signal EGO indicates exhaust gases are rich of a desired air/fuel ratio and a low voltage state of converted signal EGO indicates exhaust gases are lean of the desired air/fuel ratio. Typically, the desired air/fuel ratio is selected as stoichiometry which falls within the peak efficiency window of catalytic converter 21.

Bypass passageway 46 is shown coupled between throttle body 30 and air assist injector 38 via solenoid bypass valve 47. Controller 12 provides pulse width modulated signal AAIDTY to solenoid bypass valve 47 so that airflow is inducted into engine 10 at a rate proportional to the duty cycle of signal AAIDTY.

Controller 12 is shown in FIG. 1 as a conventional microcomputer including: microprocessor unit 50, input/output ports 52, read only memory 54, random access memory 56, and a conventional data bus. Controller 12 is shown receiving various signals from sensors coupled to engine 10, in addition to those signals previously discussed, including: measurements of inducted mass air flow (MAF) from mass air flow sensor 58 coupled to throttle body 30; engine coolant temperature (ECT) from temperature sensor 60 coupled to cooling sleeve 62; intake air temperature (ACT) from temperature sensor 64 coupled to throttle body 30; a profile ignition pickup signal (PIP) from Hall effect sensor 66 coupled to crankshaft 20. Additionally, controller 72 receives a measurement of barometric pressure (BP) from barometric pressure sensor 68.

Figure 2A:
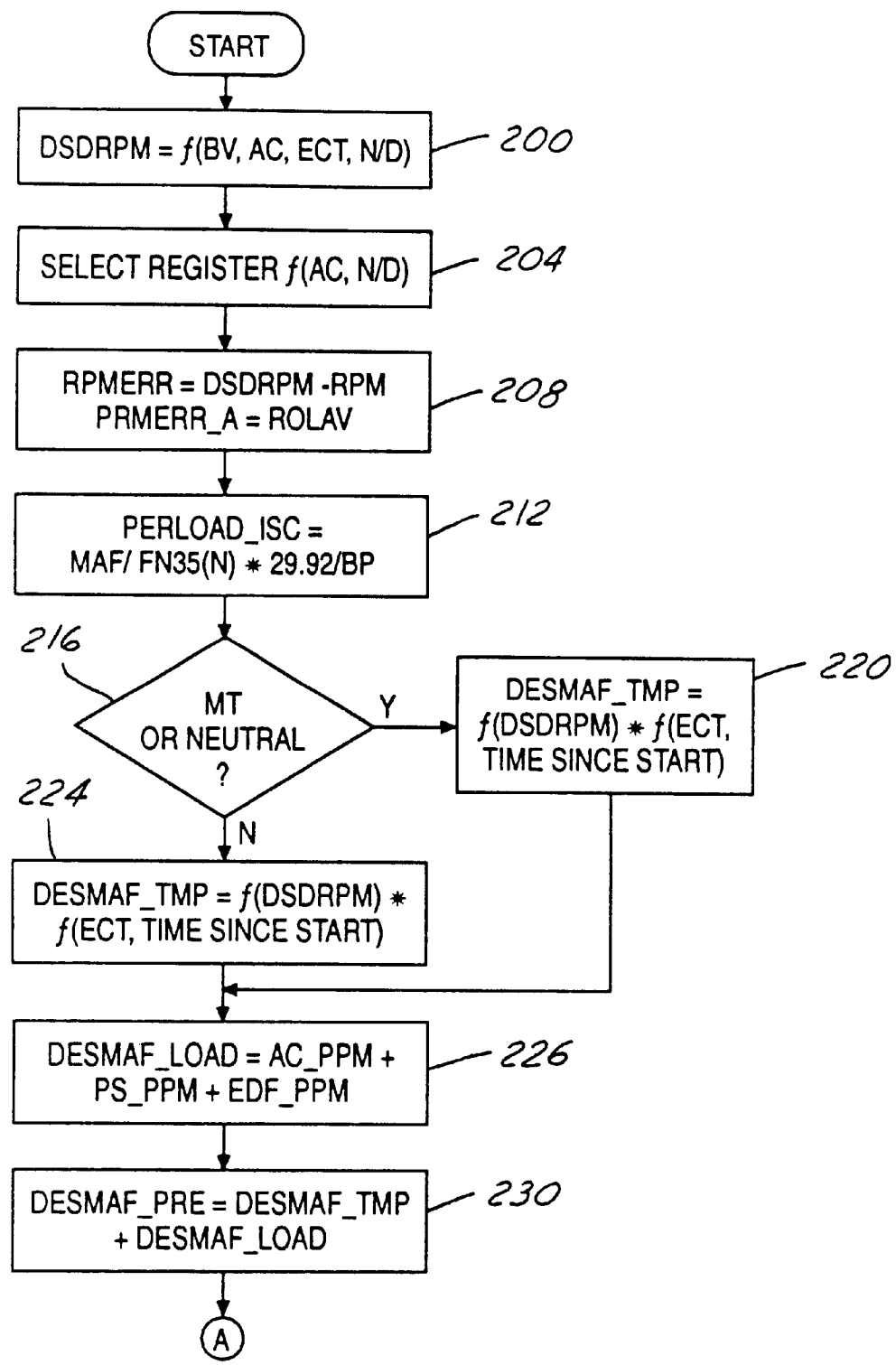
FIGS. 2–4 are flowcharts describing an air control method for an internal combustion engine having electronic throttle control.
Figure 3:
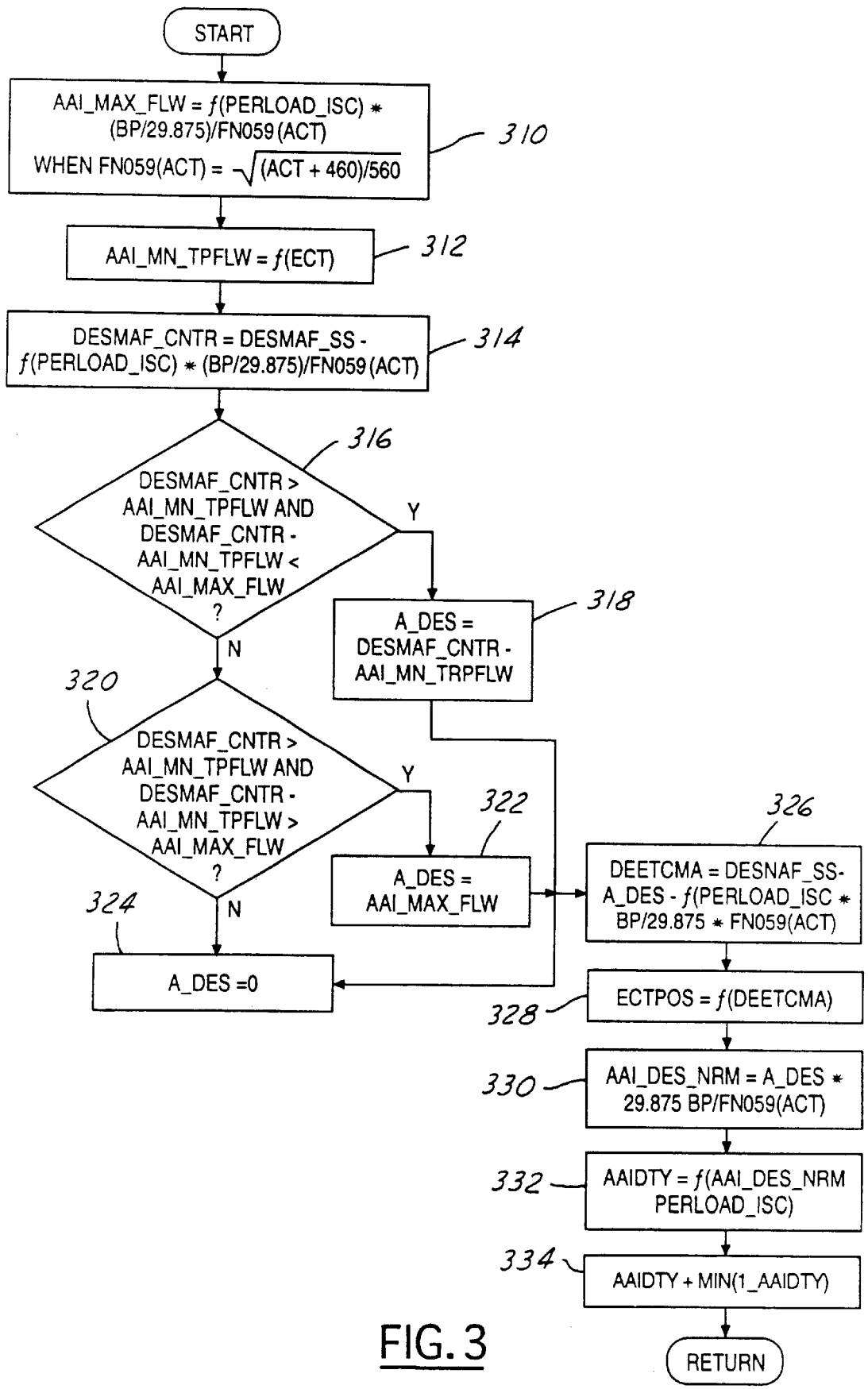
Figure 4:
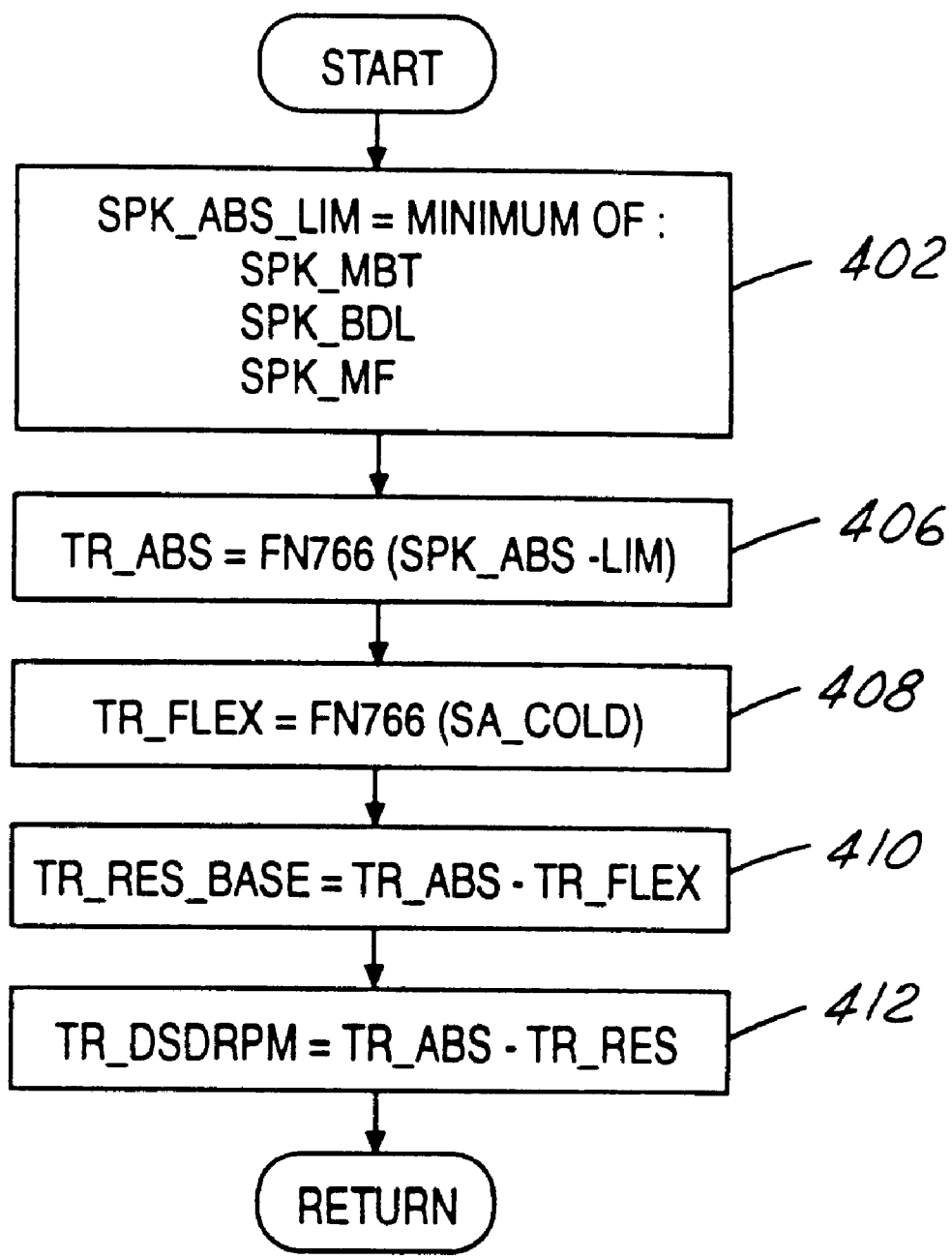
Figure 5:
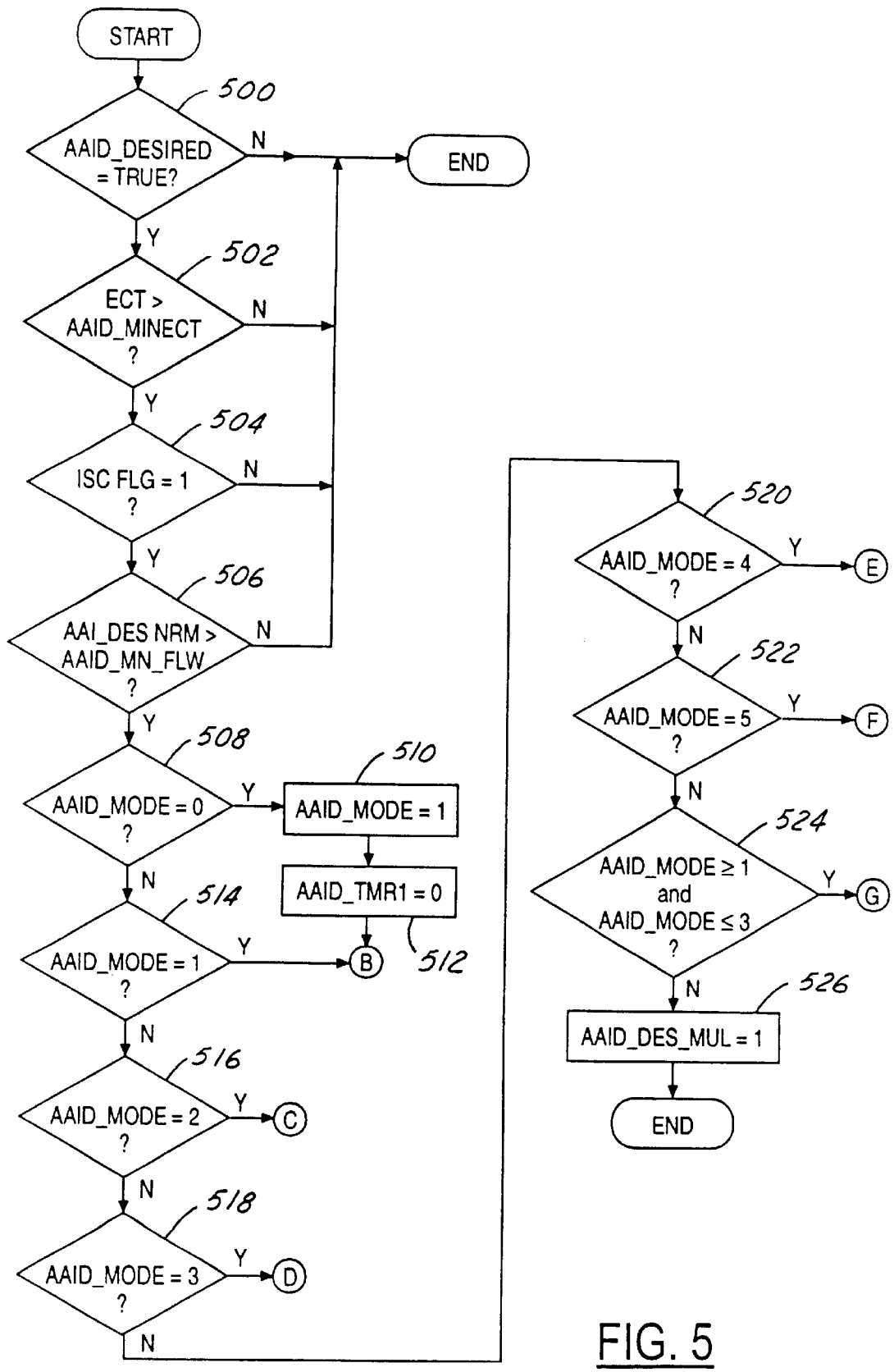
FIGS. 5–11 are flowcharts of the steps executed in an embodiment of the present invention.

In order to diagnose faults in the air assist injector system under idle speed control, it is preferable to have knowledge of the airflow through the throttle plate 32 and air assist injector 38 at steady state idle speed. In FIGS. 2, 3, and 4, a method of allocating the flow of air through the throttle plate 32 and the air assist injector 38 is described. The described airflow control system is the subject of U.S Pat. No. 6,039,023, which is herein incorporated by reference. As a convenience, the pertinent portions of the referenced application follow.

Referring now to FIGS. 2, 3, and 4, the subroutines executed by controller 12 for controlling engine idle speed will now be described. Referring first to FIG. 2, desired idle speed signal DSDRPM is first calculated as a function of battery voltage BV, air conditioner enable signal AC, engine coolant temperature ECT and the neutral or drive transmission signal N/D (step 200). One of four storage registers is selected in step 204 as a function of signal AC, and signal N/D. More specifically, the following registers are selected: a first register is selected if the transmission is not in drive and the air conditioner is on; a second register is selected if the air conditioner is off and the transmission is in drive; a third register is selected if the transmission is in neutral and the air conditioner is on; and a fourth register is selected if the transmission is in neutral and the air conditioner is off.

Idle speed error signal RPMERR is calculated in step 208 by subtracting indication of engine speed signal rpm from desired idle speed signal DSDRPM. Signal RPMERR_A is also generated which is a rolling average of signal RPMERR with exponential smoothing. During step 212, an estimate of the pressure ratio across bypass valve 47 is provided. More specifically, signal PERLOAD_ISC is calculated at step 212 by dividing a value (FN35) related to the peak air charge at wide open throttle versus engine speed into signal MAF. The resulting quotient is then multiplied by the ratio of 29.92 to barometric pressure BP.

If the vehicle has a manual transmission (MT) or an automatic transmission which is in neutral (step 216), desired air flow signal DESMAF_TMP is generated in step 220 as follows. A function of desired idle speed (DSDRPM) is multiplied times a function of engine coolant temperature (ECT) and time since engine start. On the other hand, if the answer to step 216 is negative, signal DESMAF_TMP is generated in step 224 as follows. A function of desired idle speed DSDRPM is multiplied by another function of engine coolant temperature (ECT) and the time since start.

Correction factor DESMAF_LOAD for desired mass air flow at various loads is generated during step 226. More specifically, signal DESMAF_LOAD is generated by summing signal AC_PPM when the air conditioner is on, signal PS_PPM when power steering is employed, and signal EDF_PPM when a cooling fan is activated (step 226). Open loop prediction of desired air flow signal (DESMAF_PRE) is generated during step 230 by adding previously calculated signal DESMAF_MP and signal DESMAF_LOAD.

Open loop prediction of desired air flow (signal DESMAF_PRE) is corrected by signal TR_DSDRPM which is generated from the subroutine described later herein with particular reference to FIG. 4. In general, signal TR_DSDRPM provides a correction to the open loop desired air flow and corresponding open loop bypass throttle position of bypass valve 47. This correction prevents any initial drop in idle speed which would otherwise occur upon commencement of idle speed control under conditions when ignition timing is being retarded for rapid converter warm up.

Figure 2B:
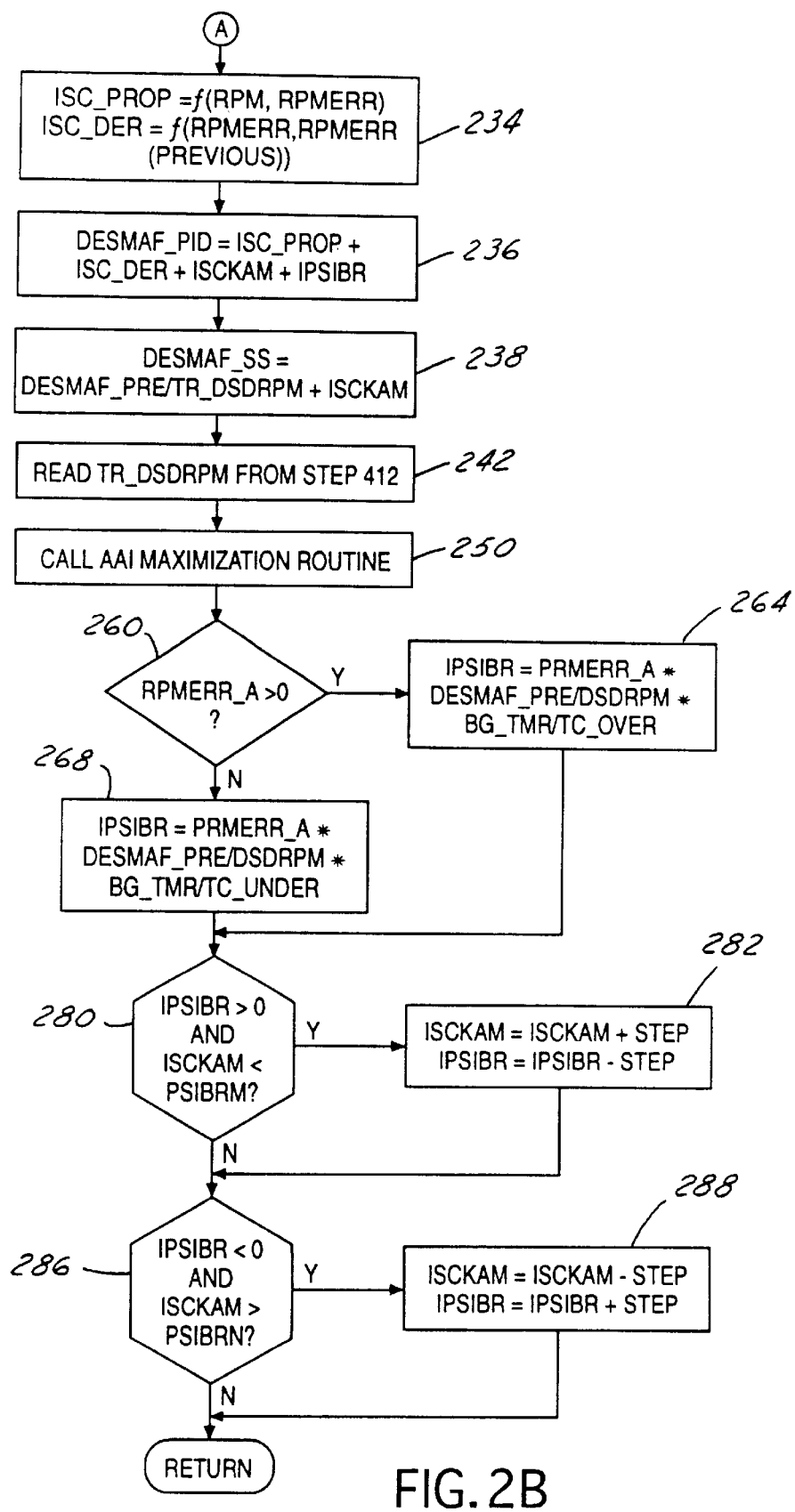

Desired mass air flow DESMAF_SS is generated from a proportional plus integral plus derivative controller as now descried with reference to steps 234–238 in FIG. 2B. Proportional and derivative control gains are first generated. Proportional gain ISC_PROP is generated as a function of rpm and error signal RPMERR. Derivative term ISC_DER is generated as a function of the difference between rpm error signal RPMERR for the present and preceding background loops (step 234). Desired air flow signal DESMAF_PID from the proportional plus integral plus derivative controller (236) is generated by summing proportional term ISC_PROP with the sum of derivative term ISC_DER, integral error term IPSIBR, and adding adapted integral term ISCKAM (step 236). Total desired air flow DESMAF_SS is then generated by adding proportional plus integral plus derivative output signal DESMAF_PID to the ratio of signal DESMAF_PRE to signal TR_DSDRPM (step 238). After TR_DSDRPM is read from the routine described later herein with particular reference to FIG. 4 (step 242), the air assist injector maximization routine is called (step 250), which calculates the signals ETCPOS and AAIDTY as described later herein with particular reference to FIG. 3.

If the rolling average of the engine speed error signal (RPMERR_A) is positive (step 260), then integral error term IPSIBR is generated as shown in the following equation:

$$IPSIBR=RPMERR\_A*DESMAF\_PRE/DSDRPM*BG\_TMR/TC\_OVER$$ where: BG_TMR is the background loop time; and TC_OVER is a calibratable time constant for overspeed.

On the other hand, when signal RPMERR_A is negative, the integral error term is calculated by the following equation:

$$IPSIBR=RPMERR\_A*DESMAF\_PRE/DSDRPM*BG\_TMR/TC\_UNDER$$ where TC_UNDER is a calibratable time constant for underspeed.

When integration term IPSIBR is positive and adaptive air flow corrections ISCKAM are less than maximum clip value PSIBRM (step 280), air flow corrections ISCKAM and integral term IPSIBR are generated by the equations shown in Step 282 as follows:

$$ISCKAM=ISCKAM(previous)+STEP$$

$$IPSIBR=IPSIBR(previous)-STEP$$

where: STEP is a calibratable step size.

When integral term IPSIBR is negative and air flow correction term ISCKAM is greater than minimum clip PSIBRN (step 286), air flow correction terms ISCKAM and integral term IPSIBR are generated by the equations shown in Step 288 as follows:

$$ISCKAM=ISCKAM(previous)-STEP$$

$$IPSIBR+IPSIBR(previous)+STEP$$

Referring now to FIG. 3, a subroutine for controlling the distribution of air controlled by throttle plate 32 and bypass valve 47 is described. Maximum airflow possible through the air assist flowpath (AAI_MAX_FLW) is calculated from a function of PERLOAD_ISC, barometric pressure BP, and ACT (step 310). Next, the minimum desired throttle mass flow to maintain an idle speed control range of authority (AAI_MN_TPFLW) for electronic throttle controller 34 is calculated as a function engine coolant temperature (ECT) (step 312). The range of authority represents the amount of airflow necessary for the idle speed control system to reject disturbances. For example, it is undesirable for throttle plate 32 to be completely closed and all of the air necessary to create the desired torque being supplied through the air assist injectors. It is undesirable because if a load is suddenly removed, such as for example the air conditioning compressor, the engine will experience a rise in engine speed because bypass valve 47 cannot react quick enough. In step 314, the desired airflow around throttle plate 32 and air assist injector 38 (DESMAF_CNTR) is calculated by the equation shown in step 314 as follows:

DESMAF_CNTR=DESMAF_SS−FN818(PERLOAD_ISC)*BP/ 29.875*FN059(ACT)

where: FN818(PERLOAD_ISC) is a function of PERLOAD_ISC and represents flow leaking into the manifold; and FN059(ACT)=square root ((ACT+460)/560).

When DESMAF_CNTR is greater than AAI_MN_TPFLW and DESMAF_CNTR-AAI_MN_TPFLW is less than AAI_MAX_FLW, the desired air assist airflow (A_DES) is set to DESMAF_CNTR-AII_MN_TPFLW (steps 316 and 318). Otherwise, when DESMAF_CNTR is greater than AAI_MN_TPFLW and DESMAF_CNTR-AAI_MN_TPFLW is greater than AAI_MAX_FLW, the desired air assist airflow (A_DES) is set to AAI_MAX_FLW, the desired air assist airflow (A_DES) is set to AAI_MAX_FLW (steps 320 and 322). Otherwise, desired air assist airflow (A_DES) is set to zero (step 324).

Continuing with FIG. 3, in step 326, the routine calculates the amount of air desired around throttle plate 32 as follows:

DEETCMA=DESMAF_SS-A_DES-FN818(PERLOAD_ISC)*BP/29.875*FN059(ACT)

where: FN818 (PERLOAD_ISC) is a function of PERLOAD_ISC and represents flow leaking into the manifold.

Next, in step 328, a desired throttle position (ETCPOS) is calculated as a function of the amount of air desired around throttle plate 32 (DEETCMA). The routine then calculates the desired air assist injector airflow equivalent at standard temperature and pressure (AAI_DES_NRM) as shown in step 328. Next, this value is converted to a duty cycle (AAIDTY) in step 332 as a function of the bypass valve versus duty cycle and pressure ratio. More specifically, signal AAIDTY is generated as a function of signals AAI_DES_NRM and signal PERLOAD_ISC. Signal PERLOAD_ISC was generated as previously described with reference to step 212. Finally, in step 334, AAIDTY is clipped to a maximum value of one because it is improper to request a duty cycle greater than one hundred percent.

Referring now to FIG. 4, the subroutine for generating correction signal TR_DSDRPM to correct open loop desired air flow signal DESMAF_PRE and the corresponding initial throttle position of bypass throttle valve 47 is now described. An absolute limit of ignition timing (signal SPK_ABS_LIM) is first selected in step 402 as the minimum of: ignition timing at maximum engine torque MBT (signal SPK_MBT), ignition timing associated with borderline knock (signal SPK_BDL); and ignition timing associated with engine misfire (signal SPK_MF).

The above generated spark absolute limit (SPK_ABS_LIM) is then converted to torque ratio TR_ABS by conversion function FN766 during step 406. In this particular example, conversion function FN766 is a table of engine output torque as a function of ignition timing.

Ignition signal SA_COLD, which is the ignition timing retard during engine startup, is converted in step 408 to torque ratio TR_FLEX by function FN766. Torque ratio TR_FLEX is the flexible torque ratio limit which may be exceeded if required to maintain engine idle speed. Reserved torque ratio TR_RES_BASE, which could correspond to a reserve in ignition timing to maintain a desired range of authority for engine idle speed control via ignition timing, is then generated in step 410 by taking the difference between torque ratio TR_ABS and torque ratio TR_FLEX.

During step 412, the correction value associated with the torque ratio at desired engine speed (TR_DSDRPM) is generated by taking the difference between absolute torque ratio TR_ABS and reserve torque ratio TR_RES.

Having described the operation of the airflow control system under idle speed control, a method of diagnosing faults in the airflow control system will now be described with reference to FIGS. 5 through 11.

The diagnostic test generally comprises the steps of measuring the airflow entering an intake of the electronic throttle control (ETC) 34 of the engine at idle speed with the air assisted injector (AAI) 38 operating at a first rate of airflow, turning the air assisted injector 38 off, measuring the airflow entering the intake of the electronic throttle 34 of the engine at idle speed with the air assisted injector 38 off, and generating an error signal as a function of the two measured values.

The AAI diagnostic test is set forth in terms of a state-machine operation with the following states being stored in the RAM variable AAID_MODE:

0=normal non-diagnostic AAI mode of operation;
1=begin the diagnostic by learning the ETC-based air mass flow under steady state idle speed control with the AAI operating at a normal level;
2=successively reduce the flow of air through the AAI until the AAI is off;
3=learn the ETC-based air mass flow under steady state idle speed control with the AAI off;
4=successively increase the flow of air through the AAI until the AAI is operating at the normal level;
5=compare the error between the two measured values and determine whether the error is large enough to be considered a fault; and
6=escape from the diagnostic routine if the driver demand signal changes.

Turning now to FIGS. 5 through 11, the AAI fault diagnostic routine will now be described with reference to the various states of the variable AAID_MODE. The diagnostic logic set forth in FIGS. 5 through 11 is preferably performed once per vehicle trip, which constitutes an engine start and stop. The logic routines, however, are executed according to the variable BG_TMR, which is the background loop timer. A typical value for BG_TMR may be, for example, 100 ms. The logic starts at step 500 and determines whether the diagnostic test is desired (AAID_DES). Since the airflow through the AAI is altered during the diagnostic, it is preferable to execute the logic while the engine is warm to minimize its effect on emissions output. At step 502, the variable AAID_MINECT determines whether the engine coolant temperature (ECT) has reached a desired minimum level to run the diagnostic. Step 504 insures that the engine is stabilized under idle speed control. Finally, at step 506, it is determined whether the desired AAI flow for the non-diagnostic mode (AAI_DES_NRM) is greater than the minimum amount of airflow (AAID_MN_FLW) through the AAI circuit required to get a good signal to noise ratio for the diagnostic test. If steps 500 through 506 are satisfied, than the state value of the variable AAID_MODE is examined to determine which logic subroutine to execute.

If operating in AAID_MODE=0(step 508), the logic routine hands off to mode one (step 510) and begins a timer (AAID_TMR1) at step 512 to monitor the time spent in mode one. The remaining modes and their corresponding subroutines are analyzed in steps 514 through 524.

At step 526, the variable AAID_DES_MUL is set equal to one. As will be explained in further detail, the value of AAID_DES_MUL can vary between zero and one, and is used to modify the desired AAI airflow (AAI_DES_NRM) during the diagnostic test.

Figure 6:
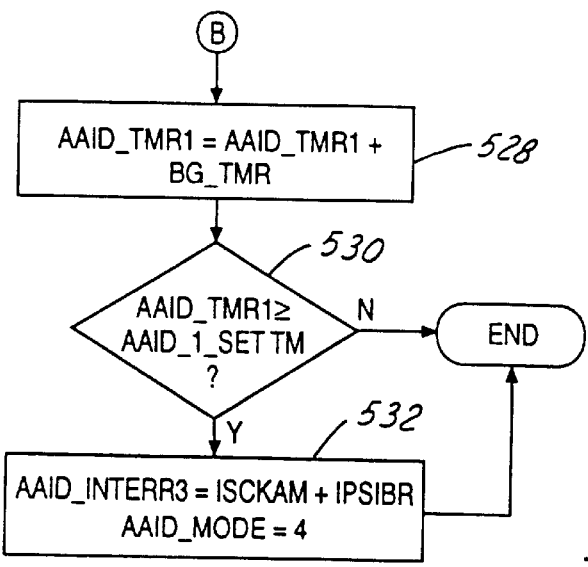

FIG. 6 describes the diagnostic logic for AAID_MODE=1. At step 528, the mode one timer (AAID_TMR1) is incremented by an amount equal to the background timer (BG_TMR). The mode one timer is used as a wait function to insure stability of the engine at idle speed, and to insure that the throttle airflow and AAI airflow have stabilized and matured. At step 530, the value of AAID_TMR1 is compared to the settling time (AAID_1_SETTM) which, for example, may equal five seconds. If the engine has sufficiently stabilized at idle, a first measurement (AAID_INTERR1) is taken of the total integral error (ISCKAM+IPSIBR) from the idle speed control strategy (step 532). Additionally, the value of AAID_MODE is incremented to two.

Figure 7:
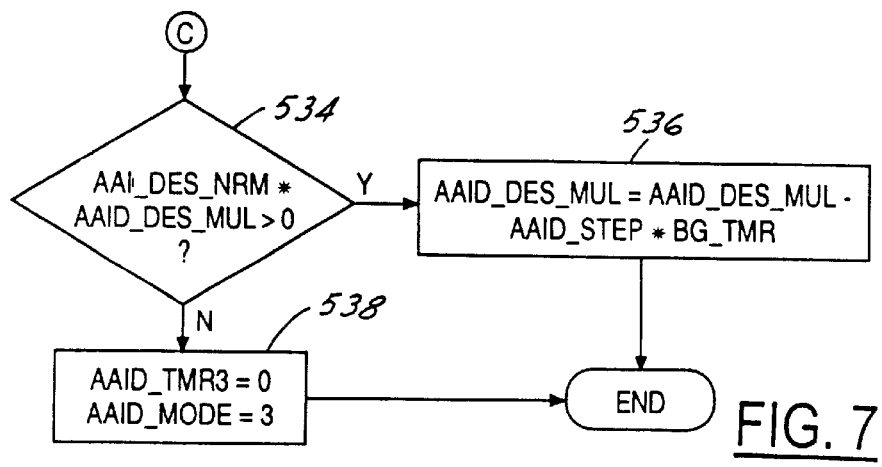

FIG. 7 describes the diagnostic logic for AAID_MODE=2 operation. In this state, the airflow through the AAI is gradually turned off. The variable (AAID_DES_MUL) varies from zero to one and dictates the amount of airflow through the AAI by varying the desired airflow through the AAI between zero and 100%. As long as air continues to flow through the AAI (step 534), AAID_DES_MUL is decremented by a predetermined step amount (AAID_STEP) at step 536. AAID_STEP is equal to the amount of AAI flow to add or subtract per second during normal ramping during the AAI diagnostic. A typical value for AAID_STEP may be, for example, 0.33 lb/min of airflow. Once the airflow through the AAI system has been shut off, the mode three timer (AAID_TMR3) is initialized and the logic passes to mode three (step 538).

In mode 3, the engine idle speed is allowed to stabilize for a predetermined period of time (AAID_3_SETTM) with the AAI system off before a second error measurement is taken. This occurs at steps 540 and 542 of FIG. 8. At step 544, the total integral error (ISCKAM+IPSIBR) from the idle speed control strategy is measured with the AAI system off. This value is stored in the variable AAID_INTERR3. The logic then continues on to mode four.

Figure 9:
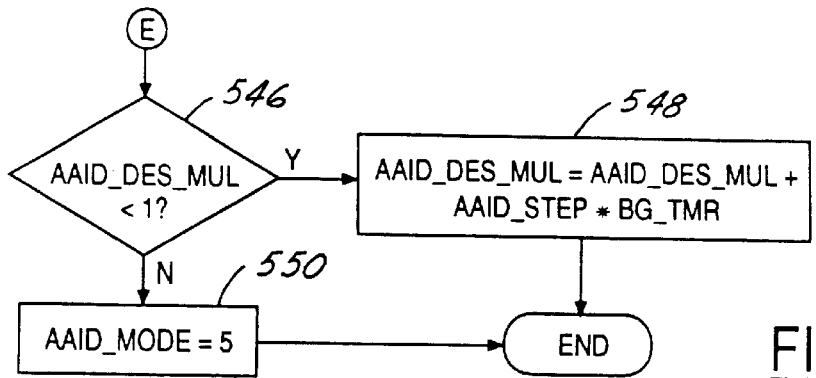

The logic subroutine for AAID_MODE=4 is shown in FIG. 9. In this mode, the AAI system is ramped on. At steps 546 and 548, airflow through the AAI system is increased in predetermined steps (AAID_STEP) until it is at 100% of the desired airflow rate. When the airflow through the AAI system is incremented to its desired rate, the state logic continues to mode five (step 550).

Figure 10:
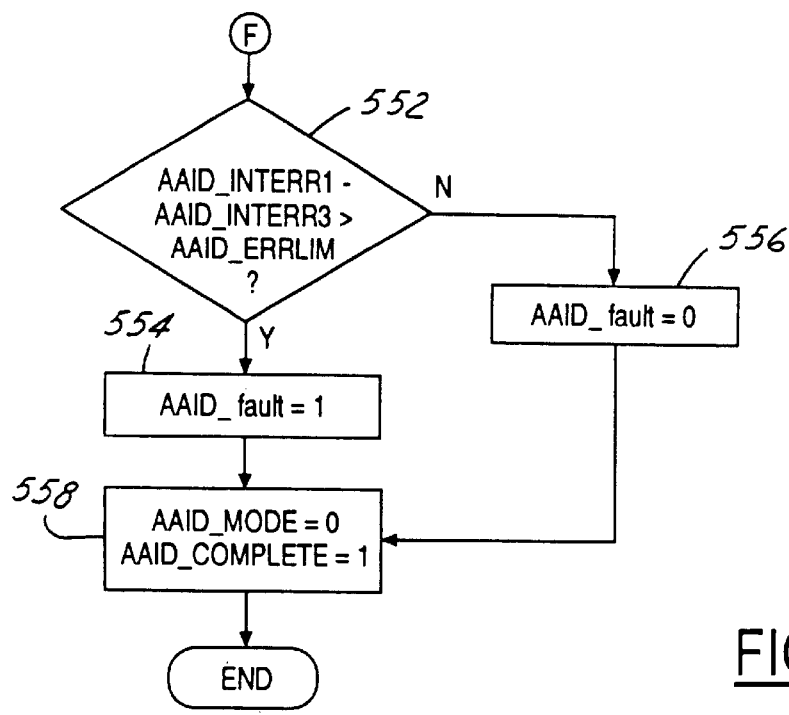

FIG. 10 describes the logic subroutine for AAID_MODE=5. At step 552, the two integral error measurements are compared against a threshold error limit (AAID_ERRLIM) to determine whether a fault in the AAI system has been detected. In other words, if the difference between the idle speed control error with the AAI system off versus the idle speed control error with the AAI system on is greater than a threshold amount, then a fault is indicated at step 554. Otherwise, the AAI system diagnostic passes, and the fault indicator is cleared at step 556. The fault indicator can be used, for example, to illuminate an instrument panel error light. At step 558, the AAID_MODE is reset to zero and a flag is set indicating that the AAI system diagnostic is complete.

Figure 11:
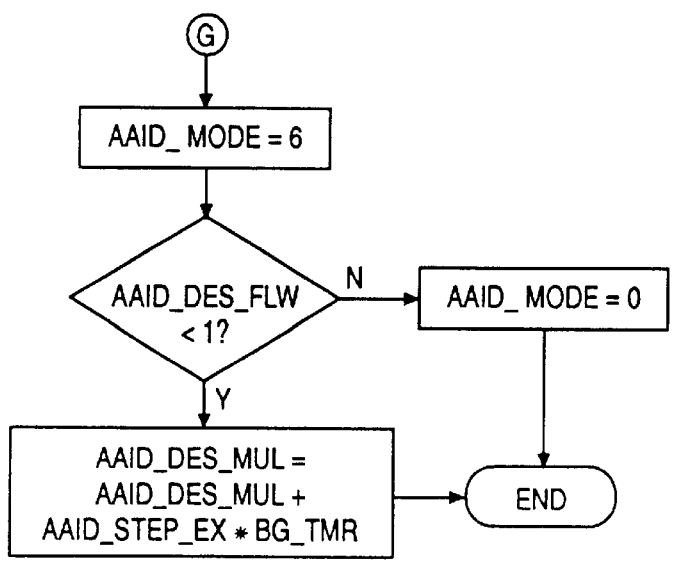

FIG. 11 describes the logic subroutine for AAID_MODE=6. Mode six is an escape routine which ramps the airflow through the AAI system to its desired level if the engine conditions should change while the diagnostic is in progress. For example, if the state machine logic is in mode two, three, or four when a tip-in occurs, the AAI flow must be blended back to its desired level (AAI_DES_NRM) as quickly as possible without affecting engine operating characteristics. This logic is similar to the subroutine logic of mode four except that it uses an alternate, preferably higher, ramp rate (AAID_STEP_EX).

In operation, assume that at an idle speed of 600 rpm, the total desired airflow (DESMAF_CNTR) through the throttle plate 32 and air assist injector 38 is equal to 2.0 lb/min. This total desired airflow will be allocated according to the logic described in FIGS. 2 through 4 into separate amounts of air desired around the throttle plate 32 (DEETCMA) and the desired airflow through the AAI (AAI_DES_NRM). Assume from the idle speed control logic that the value of DEETCMA is 1.0 lb/min and the value of AAI_DES_NRM is equal to 1.0 lb/min. Assume further that due to engine operating conditions such as friction and mechanical wear, that the idle-speed control actually requires 1.2 lb/min of air through the throttle plate 32 and 1.0 lb/min of air through the air assist injector 38 to maintain 600 rpm at idle. This 0.2 lb/min difference between the total expected airflow (2.0 lb/min) and the actual airflow (2.2 lb/min) represents the total integral error (ISCKAM+IPSIBR) from the idle speed control logic with the AAI system operating at its desired airflow. This value is stored in the variable AAID_INTERR1 during the logic execution when AAID_MODE=1 (FIG. 6).

Figure 8:
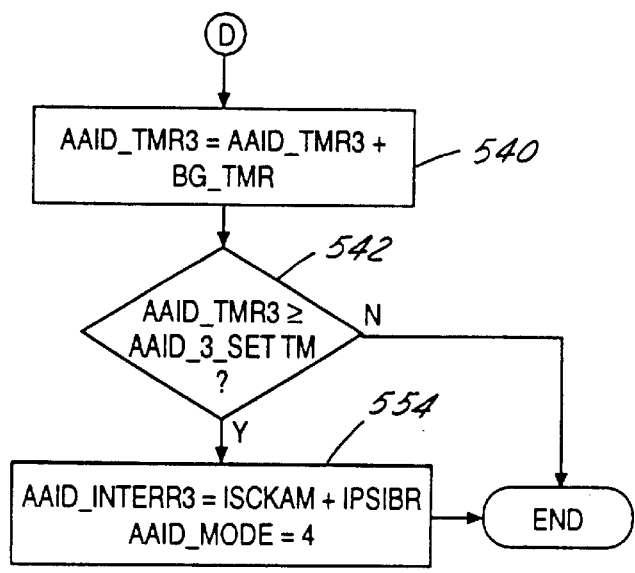

Now, assume the AAI system is turned off (AAID_MODE=2). In order to maintain steady state idle of 600 rpm, approximately 2.2 lb/min of air must pass through the throttle plate 32 above. From the open loop look-up table (Step 230, FIG. 2A), the system estimated that 2.0 lb/min of air would be required through the throttle plate 32 to maintain idle speed control. Thus, the difference between the actual airflow required to maintain idle speed control and the estimated air flow required is again 0.2 lb/min. This value is stored during the logic execution of mode three in the variable AAID_INTERR3 (FIG. 8). Thus, as can be seen from the foregoing, in a properly operating AAI system, the difference between the two integral error measurements will be minimal. In mode five, this difference (AAID_INTERR2−AAID_INTERR3) is compared against an error limit (AAID_ERRLIM) to determine whether a fault condition exists.

As a further example, assume the AAI system is malfunctioning and no air is flowing through the air assist injectors. In this case, all of the air must pass through the throttle plate 32 to maintain idle speed control of 600 rpm. Thus, the system will expect that 1.0 lb/min of air will pass through the air assist injector 38 and 1.0 lb/min of air will pass through throttle plate 32 in order to maintain idle speed control. The actual airflow through the throttle plate 32, however, will be 2.2 lb/min because no air is flowing through the malfunctioning air assist injector 38. Accordingly, the total integral error with the AAI system on will be equal to 1.2 lb/min. With the air assist injector off, the system will expect that 2.0 lb/min of air will pass through the throttle plate 32 in order to maintain idle speed control. As before, the total integral error with the AAI system off in this case will equal 0.2 lb/min. The difference between these two error measurements equals 1.0 lb/min. If the error limit (AAID_ERRLIM) is equal to, for example, 0.3 lb/min, then a fault condition will be indicated.

While the invention has been described in connection with one or more embodiments, it is to be understood that the specific mechanisms and techniques which have been described are merely illustrative of the principles of the invention. Numerous modifications may be made to the methods and apparatus described without departing from the spirit and scope of the invention as defined by the appended claims.

What is claimed is:

1. A method of diagnosing faults in an air assisted fuel injector system including an air assisted fuel injector for an internal combustion engine having electronic throttle control comprising:

operating the air assisted injector system at a first rate of airflow;

generating a first value indicative of the airflow entering an intake of the electronic throttle of the engine at idle speed with the air assisted injector system operating at said first rate of airflow;

operating the air assisted injector system at a second rate of airflow corresponding to the air assisted fuel injector being off;

generating a second value indicative of the airflow entering the intake of the electronic throttle of the engine at idle speed with the air assisted injector system operating at said second rate of airflow; and generating an error signal as a function of said first and second values.

2. The method as set forth in claim 1 further comprising, thereafter, successively increasing the flow of air through the air assisted injector system at a predetermined rate until the air assisted injector system is operating at said first rate of airflow.

3. The method as set forth in claim 1 wherein operating the air assisted injector system at a second rate of airflow includes successively decreasing the flow of air through the air assisted injector system at a predetermined rate until the air assisted injector system is off.

4. The method as set forth in claim 1 wherein operating the air assisted injector system at a first rate of airflow includes waiting a predetermined period of time for the engine idle speed to stabilize.

5. The method as set forth in claim 1 wherein operating the air assisted injector system at a second rate of airflow includes waiting a predetermined period of time for the engine idle speed to stabilize.

6. The method as set forth in claim 1 further comprising monitoring an interrupt flag and, upon detection of an interrupt, if the air assisted injector system is operating at a level of air flow less than said first rate of airflow, successively increasing the flow of air through the air assisted injector system at a predetermined rate until the air assisted injector system is operating at said first rate of airflow.

7. The method as set forth in claim 6 wherein said second predetermined rate is greater than said predetermined rate.

8. A method of diagnosing faults in an air assisted fuel injector system including an air assisted fuel injection for an internal combustion engine having electronic throttle control comprising:

determining a first expected airflow value indicative of the expected airflow entering an intake of the electronic throttle of the engine to maintain engine idle speed with the air assisted injector system operating at a first rate of airflow;

determining a second expected airflow value indicative of the expected airflow entering the air assisted injector system of the engine to maintain engine idle speed with the air assisted injector system operating at said first rate of airflow;

generating a first value indicative of the airflow entering an intake of the electronic throttle of the engine at idle speed with the air assisted injector system operating at said first rate of airflow;

determining a first error signal equal to the difference between said first value and the first expected airflow value;

operating the air assisted injector system at a second rate of airflow corresponding to the air assisted fuel injector being off;

generating a second value indicative of the actual airflow entering the intake of the electronic throttle of the engine at idle speed with the air assisted injector system operating at said second rate of airflow;

determining a second error signal equal to the difference between said second value and the sum of the first and second expected airflow values; and generating a fault signal as a function of said first and second error signals.

9. The method as set forth in claim 8 wherein operating the air assisted injector system at a second rate of airflow includes successively decreasing the flow of air through the air assisted injector system at a predetermined rate until the air assisted injector system is off.

10. The method as set forth in claim 8 further comprising, thereafter, successively increasing the flow of air through the air assisted injector system at a predetermined rate until the air assisted injector system is operating at said first rate of airflow.

11. The method as set forth in claim 8 wherein determining a first error signal includes waiting a predetermined period of time for the engine idle speed to stabilize.

12. The method as set forth in claim 8 wherein determining a second error signal includes waiting a predetermined period of time for the engine idle speed to stabilize.

13. The method as set forth in claim 8 further comprising monitoring an interrupt flag and, upon detection of an interrupt, if the air assisted injector system is operating at a level of air flow less than said first rate of airflow, successively increasing the flow of air through the air assisted injector system at a predetermined rate until the air assisted injector system is operating at said first rate of airflow.

* * * * *